United States Patent
Gheewala et al.

(10) Patent No.: US 6,649,687 B1
(45) Date of Patent: Nov. 18, 2003

(54) LOW REFLECTANCE CHEMICAL RESISTANT COATING COMPOSITIONS

(75) Inventors: Sunil C. Gheewala, Bolingbrook, IL (US); Mark J. Wytiaz, Chicago, IL (US)

(73) Assignee: The Sherwin-Williams Company, Cleveland, OH (US)

( * ) Notice: Subject to any disclaimer, the term of this patent is extended or adjusted under 35 U.S.C. 154(b) by 33 days.

(21) Appl. No.: 10/026,628

(22) Filed: Dec. 21, 2001

Related U.S. Application Data
(60) Provisional application No. 60/309,573, filed on Aug. 2, 2001, and provisional application No. 60/257,228, filed on Dec. 21, 2000.

(51) Int. Cl.$^7$ .............................. C08J 3/00; C08K 3/20; C08L 75/00; C08G 18/00
(52) U.S. Cl. ..................... 524/507; 525/185; 525/452
(58) Field of Search ..................... 524/507; 525/185, 525/452

(56) References Cited

U.S. PATENT DOCUMENTS

| | | | |
|---|---|---|---|
| 5,439,952 A | 8/1995 | Lum et al. | 523/410 |
| 5,691,410 A | 11/1997 | Escarsega et al. | 524/591 |
| 5,800,861 A | 9/1998 | Chiang et al. | 427/160 |
| 5,916,960 A | 6/1999 | Lum et al. | 524/507 |
| 6,057,400 A | 5/2000 | Kinney et al. | 524/591 |

OTHER PUBLICATIONS

Micro Powders, Inc., Technical Data Sheet, Propylmatte 31, 1 page, Rev. 4/93.
Micro Powders, Inc., "Micronized Waxes for the Printing Ink, Paint and Coatings Industries", 10/96, 6 pages.
Martinswerk GmbH, "Pergopak", 9 pages.
UCB Chemicals Corp., Radure—Ebercryl 1360, UV/EB Curable Slip Agent, 1 page, Sep. 25, 1998.

*Primary Examiner*—Patrick D. Niland
(74) *Attorney, Agent, or Firm*—Robert E. McDonald; Arthi K. Tirey; Vivien Y. Tsang

(57) ABSTRACT

A chemical resistant water reducible coating composition comprising:
(i) an active hydrogen functional water dispersible polyurethane polymer;
(ii) a crosslinking agent reactive with the active hydrogen functional polymer under curing conditions:
(iii) a mixture of polymeric beads dispersed within the polymer wherein the mixture comprises:
 (a) polyolefin beads having a mean particle size as measured by laser diffraction analysis of about 5 to 40 microns; and
 (b) polyurea polymeric beads having a mean particle size of less than 15 microns
wherein the mixture of polymeric beads is present at a level to provide an 85° gloss less than 3 and a 60° gloss less than 3.

13 Claims, No Drawings

LOW REFLECTANCE CHEMICAL RESISTANT COATING COMPOSITIONS

CROSS-REFERENCE TO RELATED APPLICATION

This application claims the benefit of U.S. Provisional Application Nos. 60/257,228, filed Dec. 21, 2000 and 60/309,573, filed Aug. 2, 2001.

BACKGROUND OF THE INVENTION

1. Field of the Invention

This invention relates to coating compositions having excellent chemical resistance and extremely low gloss. These properties are obtained by the selection of a combination of polymeric opacifying polymeric beads of small particle size.

2. Description of the Prior Art

The use of low gloss, chemical resistant coatings has been known in the prior art. U.S. Pat. No. 5,691,410 teaches camouflage coatings which are resistant to penetration by chemical warfare agents according to military specification MIL-C-46168. These coatings comprise a water reducible polyurethane resin, a water dispersible polyisocyanate resin and pigmentation which includes polymeric beads. U.S. Pat. No. 5,800,861 teaches the preparation of low gloss coating compositions comprising an active hydrogen functional resin, a suitable crosslinker, and synthetic opacifying polymeric beads.

The prior art, however, has not taught the specific combination of polyolefin beads, such as polypropylene beads, polyethylene beads, etc., along with polyurea polymeric beads all of a specific defined particle size to provide low gloss and excellent chemical resistance. The combination of these two types of beads provides a flattening efficiency greater than the use of either bead by itself and, due to the very small particle size, can provide a much more continuous surface film of the cured coating to minimize the adverse affects of chemical agents. The selection of this combination provides low gloss coatings while minimizing or even eliminating the need for silicas or other extender pigments, and can minimize or eliminate the need for very large particle size polymeric beads thereby providing better chemical resistance, chalking resistance, burnishing resistance and outdoor weathering at a favorable cost.

BRIEF SUMMARY OF THE INVENTION

This invention relates to chemical resistant water reducible coating compositions comprising:

(i) an active hydrogen functional water dispersible polyurethane polymer;
(ii) a crosslinking agent reactive with the active hydrogen functional polymer under curing conditions;
(iii) a mixture of opacifying polymeric beads dispersed within the polymer wherein the mixture comprises:
  (a) polyolefin beads having a mean particle size of about 5 to 40, especially 5 to 15 microns;
  (b) polyurea polymeric beads having a mean particle size of less than 15 microns wherein the mixture of polymeric beads is present at a level to provide an 85° gloss less than 3 and a 60° gloss less than 3. By the term "mixture of opacifying polymeric beads" is meant only that at least one polyolefin bead component and at least one polyurea bead component is present in the final coating. The polyolefin and polyurea polymeric beads themselves do not need to be mixed together prior to dispersion in the coating.

Typically, when utilized herein, the mean particle size is determined by measurement by laser diffraction analysis. It is especially preferred in the practice of this invention for many applications to utilize polyethylene beads, or especially, polypropylene beads, as the polyolefin bead. Mixtures providing more than one polyolefin bead in the coating are also possible.

This invention relates to a coating composition and also to a process for treating the surface of a substrate to provide a chemical resistant and low reflectance coating by applying the coating of this invention to the substrate and allowing it to cure. Active hydrogen functionality means those reactive groups as determined by the Zerewitinoff Method as described by Kohler in *J Am. Chem. Soc.*, 49, 3181 (1927) and typically include —OH, —NH, —SH, and —COOH.

Accordingly, it is an object of this invention to provide a durable coating composition having relatively low gloss and excellent chemical resistance, especially resistance to chemical warfare agents.

DETAILED DESCRIPTION OF THE INVENTION

The water dispersible polyurethane resins of this invention are well known in the art and their method of preparation is not critical to this invention. Representative polyurethane dispersions can be prepared by the reaction or chain extension of a polyisocyanate and one or more polyols, generally with at least one of the polyols having a carboxyl group or a nonreactive amine group which can be neutralized to provide water dispersibility. The polyurethane resins should have pendant active hydrogen functional groups for subsequent reaction with the crosslinker. Representative commercially available polyurethane dispersions include those offered under the Bayhydrol and NeoRez trademarks from Bayer and Zeneca, respectively. Other representative polyurethane dispersions include those taught in U.S. Pat. No. 6,057,400.

The crosslinking agent can be any crosslinker reactive with active hydrogen compounds and can include aminoplast resins. such as melamines and ureas, and blocked or unblocked polyisocyanates.

The opacifying polymeric beads are also well known in the art and can be prepared by any conventional method. Typically, the polyolefin beads are prepared by reacting discreet droplets of monomers such as propylene, ethylene and optionally other copolymerizable monomers while suspended in an inert liquid, such as hexane, in which the droplets are insoluble. For many applications requiring very low gloss and better grind, the polyolefin beads should have a mean particle size of 5 to about 40, and often 5 to 15 microns. Representative commercial polyolefins include straight chain hydrocarbon waxes produced by the Fischer-Tropsch process such as the MP series of products produced by Micro Powders, Inc. of Tarrytown, N.Y. Representative commercial polyethylene waxes include the MPP, Micropro®, Propylmatte®, Propyltex®, Polysilk®, and Superslip® products and the polyethylene/PTFE combinations marketed as the Polyfluo® products all of which are available from Micro Powders, Inc.

The polyurca beads are well known and can be representatively prepared by reaction of polyamines and polyisocyanates or by other methods well known in the art. For example, extremely small droplets of polyisocyanates and polyamines can be dispersed in an insoluble medium such as hexane and allowed to react to produce polyurea beads. Alternatively, a hydrophilic polyisocyanate or polyisocyanate functional prepolymer can be emulsified in an agitated aqueous solution to produce polyurea beads which can be allowed to flocculate and then dried. A representative preferred commercially available polyurea bead is Pergopak® manufactured by Martinswerk GmbH. Other commercially available polyureas include the Bermasilk® products from Bergin Chemical. More than one polyurea bead can be included in the coatings.

The opacifying polymeric beads would typically be present at at least 1% by weight of the total weight solids of the coating composition, and for generally desirable gloss ranges will be present at a level of 1% to about 40%, and especially 10% to about 30%, by weight of the total weight solids of the coating.

The coating compositions basically comprise an active hydrogen functional water reducible polyurethane polymer, a crosslinking agent reactive with the actual hydrogen functional polymer, polyolefin beads and polyurea beads. To obtain the most desirable properties for the majority of uses, the ratio of polyolefin beads to polyurea beads should be about 5/95 to about 95/5 by weight.

The coatings can contain other additives and raw materials such as pigments, catalysts, surfactants, ultraviolet light absorbers, etc. and the coatings can be applied to any substrate such as metal, plastic, wood, glass, etc.

It is especially preferred in the practice of this invention to utilize a hydroxy-functional polyurethane and a polyisocyanate crosslinker. In at least one application for the coatings of this invention, relatively high levels of excess equivalents of isocyanate groups are preferred and for some applications NCO/OH ratios of at least 3/1 up to 7/1 or higher are useful.

The following Examples are provided to illustrate, but not limit, the scope of this invention. Unless otherwise stated, parts are parts by weight, grind is a Hegman grind gauge reading and the viscosity is in Krebs units. Representative coatings were prepared by combining the following materials:

EXAMPLE 1

| Raw Material | Parts |
| --- | --- |
| [1]Bayhydrol XP-7110E | 284.6455 |
| Byk-023 Defoamer | 6.0174 |
| Lampblack Acidic | 20.223 |
| 1410M Bayferrox Yellow Oxide | 73.7429 |
| Red Oxide Light-Precipitated | 9.8491 |
| [2]Propyltex 325S | 54.8649 |
| Deionized Water | 46.6298 |
| Bayhydrol XP-7110E | 64.8946 |
| [3]Propylmatte 31 Polypropylene Bead | 40.116 |
| [4]Michem Emulsion 39235 | 67.9447 |
| 4% Bentone Ad Slurry | 136.7251 |
| [5]Tego Glide 100 | 2.9657 |
| Silquest A-189 Silane | 12.1533 |
| Deionized Water | 45.4841 |
| Deionized Water | 45.4798 |
| | 911.7359 |

[1]commercially available polyurethane dispersion
[2]micronized polypropylene wax having a mean particle size of 25–35 microns and a maximum particle size of about 74 microns-commercially available from Micro Powders, Inc.
[3]polypropylene wax having a mean particle size of 8–12 microns and a maximum particle size of about 31 microns-commercially available from Micro Powders, Inc.
[4]commercially available polyethylene wax emulsion from Michleman Inc.
[5]dispersing agent available from Tego Chemie

EXAMPLES 2–7

The coating formula of Example 1 was repeated except that the polymeric bead blends were changed as shown below, the coatings were mixed using a high speed disperser with Bayhydur XP-7007 (polyisocyanate crosslinker from Bayer) at an NCO/OH ratio of 5/1 and spray applied to primed substrates. The coating variations and performance are set forth in the table below:

| Example # | Propylmatte 31 | Propyltex 200 SF[6] | Propyltex 325S | Pergopak M-3[7] | Gloss 60–85 | Grind/Viscosity |
| --- | --- | --- | --- | --- | --- | --- |
| 1 | 40 | 0 | 55 | 0 | 4.5/5.5 | 2/58 |
| 2 | 40 | 0 | 0 | 76 | 1.2/1.4 | 2/57 |
| 3 | 112 | 0 | 0 | 0 | 4.0/4.2 | 3/60 |
| 4 | 0 | 0 | 0 | 123 | 0.4/1.4 | 1/83 |
| 5 | 0 | 40 | 0 | 76 | 1.1/0.8 | 1/68 |
| 6 | 36 | 36 | 0 | 69 | 1.0/1.0 | 1/65 |
| 7 | 0 | 39 | 0 | 84 | 0.7/0.8 | 1 |
| 8 | 0 | 39 | 0 | 94 | 0.5/0.7 | 1 |

[6]micronized polypropylene wax having a mean particle size of 25–35 microns and a maximum particle size of 74 microns-commercially available from Micro Powders, Inc.
[7]polyurea bead having a mean particle size of about 5 microns-commercially available from Martinswerk GmbH The best combinations of low gloss and acceptable grind and viscosity and other performance characteristics are the blends incorporating both the polypropylene bead and the polyurea bead. The best combination for grind, extreme flatting, and viscosity is in Example 2 where the mean particle size of the polyolefin bead, as well as the mean particle size of the polyurea bead are both less than 15 microns.

While this invention has been described by a specific number of embodiments, other variations and modifications may be made without departing from the spirit and scope of the invention as set forth in the appended claims. The entire disclosures of all applications, patents, and publications cited herein are hereby incorporated by reference.

What is claimed is:

1. A chemical resistant water reducible coating composition comprising:
    (i) an active hydrogen functional water dispersible polyurethane polymer;
    (ii) a crosslinking agent reactive with the active hydrogen functional polymer under curing conditions;
    (iii) a mixture of polymeric beads dispersed within the polymer wherein the mixture comprises:
        (a) polyolefin beads having a mean particle size of about 5 to 40 microns; and
        (b) polyurea polymeric beads having a mean particle size of less than 15 microns
    wherein the mixture of polymeric beads is present at a level to provide an 85° gloss less than 3 and a 60° gloss less than 3.

2. The coating of claim 1 wherein the mixture of polymeric beads is present at a level of 1% to 40% by weight of the total weight solids of the coating composition.

3. The coating of claim 1 wherein the weight ratio of polyurea beads to polyolefin beads is 5/95 to 95/5.

4. The coating of claim 1 wherein the polyolefin beads comprise polypropylene beads.

5. The coating of claim 1 wherein the polyolefin beads have a mean particle size of about 5 to 15 microns.

6. The coating of claim 1 wherein the polyurethane polymer has pendant hydroxyl groups.

7. The coating of claim 1 wherein the crosslinking agent is a polyisocyanate.

8. The coating of claim 6 wherein the crosslinking agent is a polyisocyanate.

9. The coating of claim 8 wherein the NCO/OH ratio is at least 3.0 to 1.

10. The coating of claim 9 wherein the NCO/OH ratio is 3/1 to 7/1.

11. The coating of claim 2 wherein the mixture of polymeric beads is present at a level of 10% to 30% by weight of the total weight solids of the coating composition.

12. A water reducible coating composition comprising:
   (i) an active hydrogen functional water dispersible polymer;
   (ii) a crosslinking agent reactive with the active hydrogen functional polymer;
   (iii) polyolefin beads having a mean particle size of about 5 to 40 microns; and
   (iv) polyurea beads having a mean particle size of less than about 15 microns.

13. The coating of claim 12 wherein the polyolefin beads and polyurea beads are present at a level to provide an 85° gloss less than 3 and a 60° gloss less than 3.

* * * * *